INVENTOR.
LAWRENCE D. NINNEMAN
BY Spencer L. Blaylock Jr
W. A. Schaich
ATTORNEYS April 5, 1966    L. D. NINNEMAN    3,244,778
METHOD OF AND APPARATUS FOR MAKING PLASTIC ARTICLE
Filed May 14, 1962    2 Sheets-Sheet 2

INVENTOR.
LAWRENCE D. NINNEMAN
BY Spencer L. Blaylock Jr.
W. A. Schaich
ATTORNEYS

United States Patent Office 3,244,778
Patented Apr. 5, 1966

3,244,778
METHOD OF AND APPARATUS FOR MAKING
PLASTIC ARTICLE
Lawrence D. Ninneman, Toledo, Ohio, assignor to Owens-Illinois Glass Company, a corporation of Ohio
Filed May 14, 1962, Ser. No. 194,401
6 Claims. (Cl. 264—89)

The present invention relates to a method of and apparatus for making a blown plastic article and, more particularly, to a method and apparatus wherein a blowable parison is injection molded about a mold core and is subsequently stripped from the core by concurrent relative core-parison movement and limited parison inflation.

In the presently pending application of Thomas R. Santelli, Serial No. 146,686, filed October 17, 1961, there is disclosed an improved blown plastic article and a method of and apparatus for making such an article. The present invention pertains to one aspect of the method and apparatus disclosed in said Santelli application, which is assigned to the assignee of the present invention.

Generally, the method of the present invention involves the injection molding of a parison or blowable preform from plasticized thermoplastic material by an injection molding procedure, the parison being formed in a mold space defined by a surrounding open ended parison mold communicating at one end with a separable mold, such as a neck mold or the like, and communicating at the other end with a source of plasticized material. Disposed within this mold space and projecting thereinto in cantilever fashion in a mold core comprising a sleeve which is concentric with the mold space, this sleeve preferably fits snugly within the separable mold to close the one end of the parison mold and has an open free end positioned adjacent the other end of the parison mold space. Projecting axially through the core sleeve is an actuating rod carrying at its lower end a valve element or disc movable relative to the free open end of the sleeve.

Normally, the actuating rod is retained in a retracted position at which the valve element closes the free end of the sleeve during the filling of the mold space with plasticized material. However, the valve element is movable, by means of its rod, relative to the sleeve, so that the end of the sleeve is spaced from the valve element to accommodate the flow of fluid from the interior of the sleeve to the exterior thereof.

In operation, the plasticized material is injected into the mold cavity defined by the parison mold sections, the separable neck mold section, the sleeve and the valve element, such injection preferably occurring through an open side of the mold by means of an injection ram effectively closing the lower open end of the parison mold space during the injection molding operation.

At the conclusion of the injection molding operation the parison, the separable neck mold section, and the core-valve element assembly are removed from the injection mold space, either by opening separable parison mold sections or by stripping from a fixed parison mold cavity. Thus, the parison surrounding the core is exposed beyond the parison mold cavity.

The core sleeve is next stripped from the interior of the parison so that air or other blowing medium can be injected into the parison to expand it within a surrounding blow mold. To facilitate this stripping operation, a limited volume of air at a pressure very slightly exceeding atmospheric pressure, preferably on the order of less than one pound per square inch above atmospheric pressure, is introduced into the core seleeve, the valve element and the core sleeve are relatively moved to permit the escape of the blowing medium from the interior of the sleeve into the interior of the parison, the parison is radially inflated to space it from the sleeve and to aid in stripping the sleeve upon relative axial displacement of the sleeve and the parison. Preferably, this slight inflation of the parison and the axial separation of the parison and the sleeve occurs at the same time, so that the sleeve may be rapidly and freely stripped.

To support the parison during the separating movement of the parison and the sleeve, the parison remains in contact with the upper separate neck mold and the valve element of the core. The parison, still supported as above described, is then transferred into a blow mold and inflated therein at a substantially higher pressure exerted by an appropriate blowing medium, so that the parison is fully inflated into conformity with the blow mold cavity.

The inflation of the parison serves not only to insure stripping of the parison from the sleeve, but outwardly distends the parison from contact with the sleeve. Since air under slight inflating pressure is supplied to the sleeve interior, the heat conductive sleeve will be cooled. By spacing the parison interior surface from the sleeve exterior surface, any conductive heat loss from the parison to the sleeve is prevented and any substantial temperature gradient across the thickness of the parison is reduced.

Thus, it will be appreciated that the present invention has, as an important object thereof, the provision of an improved method of and apparatus for injection molding a parison about an interior supporting element and subsequently inflating the parison from heat transfer contact with the interior supporting element prior to its full inflation within a blow mold.

Another important object of the present invention is the provision of a method of making a blowable injection molded parison upon an interior supporting element and including the injection of a limited volume of low pressure inflation medium into the parison to inflate it from heat transfer contact with the interior supporting element.

It is a further important object of the present invention to provide a method of making a blown plastic container by injection molding an inflatable parison of heat softened plasticized material having an integral neck portion confined within a neck mold, internally supporting the parison during and after injection molding upon a displaceable sleeve, and then stripping the parison from the sleeve as the parison one end is supported by the neck mold by axially retracting the sleeve from the interior of the parison and concurrently slightly inflating the parison from intimate surface contact with the exterior of the sleeve.

It is yet another, and no less important, object of the present invention to provide an improved process for the manufacture of a blown plastic article by the injection molding of a blowable parison about a supporting sleeve, relatively axially displacing the parison and the sleeve while supporting each extremity of the parison and while injecting a blowing medium into the parison to inflate it from intimate surface contact with the sleeve.

Still another object of the present invention is the provision of an apparatus for injection molding a blowable parison of plasticized material and including a mold core about which the parison is injection molded, means for displacing the core axially from the parison, and means for injecting air under pressure into the sleeve for inflating the parison to aid in stripping the core therefrom and to reduce heat transfer therebetween.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
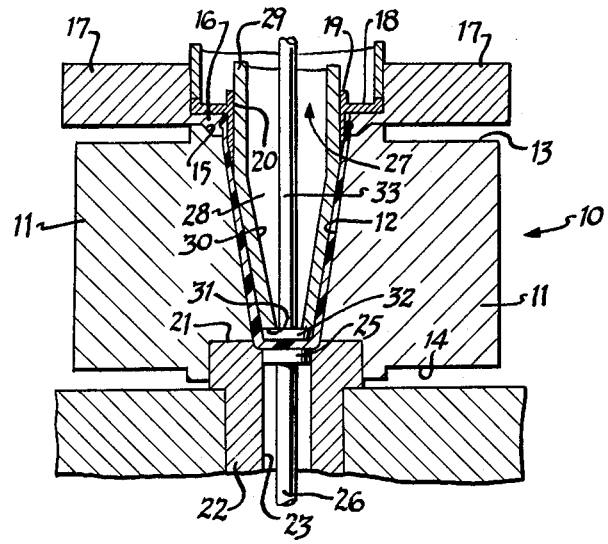
FIGURE 1 is a schematic illustration of an apparatus of the present invention capable of carrying out the method of the present invention and illustrating the step of injection molding of the parison.

As shown on the drawings:

In FIGURE 1, reference numeral 10 refers to an apparatus for carrying out the method of the present invention. The apparatus indicated generally at 10 is, of course, part of a complete injection molding and blowing machine and process. Such a complete machine and process is disclosed in the above-referred to application of Thomas R. Santelli and reference to said application may be made for the organization and operation of the complete apparatus. The disclosure of the instant application, thus, can be limited to the specific apparatus and manipulative steps necessary to carrying out the specific present invention.

More particularly, the apparatus 10 includes a pair of injection mold sections 11 cooperably defining an open ended, generally tapered injection mold recess 12. This recess 12 tapers generally downwardly and inwardly from the upper extremities 13 of the mold sections to the lower extremity 14 thereof.

The upper extremities 13 of the mold sections are provided with a generally conical recess 15 snugly and concentrically receiving therein a corresponding conical projection 16 formed at the lower inner surface of a split neck mold 17. This neck mold 17, in turn, receives therein a neck mold sleeve 18 having an inner collar 19 projecting downwardly into the parison mold cavity 12 to define an inner cylindrical guiding surface 20 for a purpose to be hereinafter more fully described.

The lower faces 14 of the parison mold sections 11 are recessed as at 21 to receive therein the upper end of a feed bushing 22 having a bore 23 through which plasticized material is advanced by an injection ram 25 snugly fitting within the bore and actuated by an actuating rod 26. As explained in the above-referred to Santelli application, plasticized material is deposited in the bore 23 in advance of the piston 25 and displacement of the piston 25 by the rod 26 advances such material into the parison mold space 12. The effective or end face of the piston 25 covers substantially one end face of the mold space 12 for reasons also explained in said Santelli application.

The neck mold collar 19 receives therethrough and in sliding contact with the inner peripheral surface 20 thereof a mold core 27. This mold core comprises a sleeve 28 having an upper cylindrical portion 29 snugly engaging the surface 20 and a lower, downwardly and inwardly convergent, generally frusto-conical tapered portion 30 terminating in a lower open end 31 of about the same external diameter as the diameter of the piston 25. Disposed within this sleeve 28 is a vertically actuatable valve rod 33 having an end valve element or disc 32 disposed exteriorly of the sleeve and having a planar upper surface closing the open end 31 of the sleeve. This disc 32 acts in opposition to the piston ram 25 to define therebetween the bottom of the mold space 12, while the tapered lower portion 30 of the sleeve 28 cooperates with the peripheral mold wall 12 of the parison mold segments 11 to define therebetween the remainder of the injection mold space, this injection mold space communicating freely with the neck mold space defined between the neck mold sections 17 and the exterior periphery of the neck mold collar 19.

Figure 2:
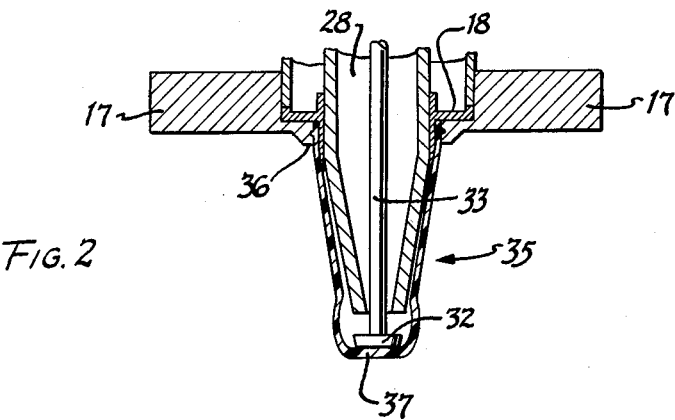
FIGURE 2 is a view illustrating the initiation of stripping of the parison from the core, the parison being inflated during such stripping.

As fully explained in the above-identified application of Thomas R. Santelli the valve stem 33 and the sleeve 28 are relatively vertically movable from overhead cross heads integrated into the overall machine design. The neck molds 17 are also vertically movable by the cross head structure and are laterally openable by fluid pressure actuated cylinders. The parison mold sections 11 are laterally openable by separate actuating cylinders to expose the injection molded parison as illustrated in FIGURE 2.

In operation, the first operation after positioning of the various mold-defining elements as illustrated in FIGURE 1 is the advancement of the ram 25 to fill the parison mold space with plasticized material. After this plasticized material has been chilled sufficiently following such injection molding, the ram 25 is retracted, and the parison mold sections 11 are laterally spread to expose the resultant parison 35 as illustrated in FIGURE 2. Alternatively, the parison 35 may be exposed by a vertical movement of the cross heads to concurrently elevate the neck mold sections 17 and the neck mold sleeve 18, the core 27, and the parison 35. In the event such vertical displacement is utilized, a solid parison mold 11 rather than the illustrated sectional parison mold may be utilized.

In either event, the exposed parison is supported at its open or upper end 36 by the confinement of the injection molded neck portion of the final container intermediate the neck mold sections 17 and the neck mold sleeve 18, while the lower closed end 37 of the parison 35 is supported by its contact with the exposed planar undersurface of the valve disc 32.

By the time the parison is exposed beyond the parison molds 11, the interior of the sleeve 28 is supplied with air or other blowing medium at a very low pressure, preferably on the order of less than one pound per square inch above atmospheric pressure. In the above-identified application of Thomas R. Santelli, such air supply means are illustrated in FIGURE 39. This air under pressure interiorly of the sleeve 28 cannot escape through the open end 31 of the sleeve so long as the lower open end 31 of the sleeve contacts the upper surface of the valve disc 32. However, upon relative movement of the valve disc 32 and the sleeve 28, this air under low pressure is allowed to escape about the actuating pin 33 and intermediate this sleeve and the inner periphery of the sleeve. This low pressure air is effective to expand the parison 35, the expansion initially occurring adjacent the lower end of the parison as best illustrated in FIGURE 2 of the drawings.

To accommodate the escape of this inflation air or other blowing medium, the sleeve 28 may be retracted upwardly by its appropriate cross head or, alternatively, the valve disc 32 may be moved downwardly by its cross head. In either event, the same result is obtained, namely a slight inflation of the parison in a direction radially outward with respect to the exterior periphery of the sleeve 28. The low pressure expansion or "puffing" of the parison removes the parison from heat transfer relation to the metallic sleeve 28. Thus, there is no direct or conductive chilling effect exerted on the parison by the sleeve, the parison remains easily blowable, and there is no appreciable temperature gradient between the interior and exterior surfaces of the parison. At substantially the same time, the sleeve 28 is actuated upwardly to axially retract the sleeve from the parison. Due to the tapered configuration of the sleeve end 30 projecting beyond the neck mold collar 19, any retracting movement of the sleeve relative to the parison will immediately and uniformly radially space the sleeve exterior surface from the interior surface of the parison. The inflation of the parison with the low pressure air introduced through the sleeve 28 will aid in stripping the sleeve from the interior surface of the parison.

Figure 3:
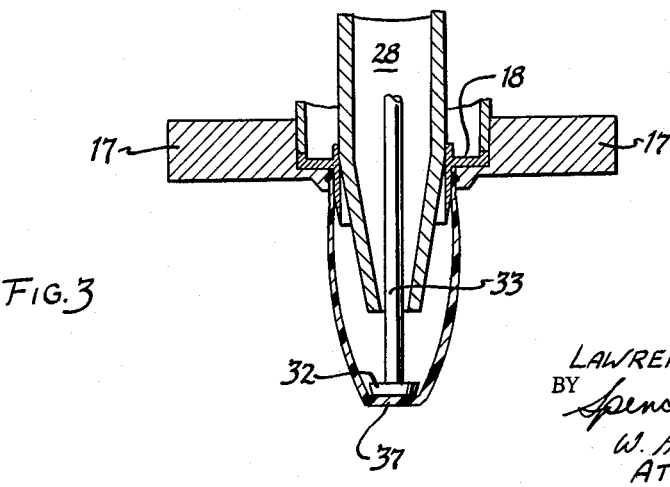
FIGURE 3 is a view similar to FIGURE 2 illustrating the relative positions of the core and the parison when stripping is substantially complete.

Since only the sleeve 28 is moved upwardly while the valve disc 32 occupies either its original position or a slightly depressed position therebeneath to first accommodate the enttry of the low pressure air into the parison 35, the lower end 37 of the parison 35 remains supported. The collar 19 surrounding the upper portion of the sleeve guides the sleeve in its upper movement while at the same time confining the upper end of the parison by its coaction with the neck mold segments 17. Upon continued vertical axial displacement of the sleeve interiorly of the parison and continued venting of the parison to the low pressure air, the intermediate portions of the parison will also be expanded as indicated in FIGURE 3 of the drawings. This expansion has occurred while the parison is still firmly supported at both ends.

Next, the parison is transferred to a sectional blow mold comprising sections 40 (FIGURE 4) having interior wall surfaces 41 defining the final configuration of the container or other article to be blow molded. Alternatively, the blow mold sections 40 can be merely closed upon the parison in its condition of FIGURE 3 without the necessity of transferring the parison to a separate blow molding station.

In either event, following enclosure of the parison within the blow mold segments 40, the parison is fully inflated with air at a substantially higher pressure, i.e. on the order of sixty to one hundred pounds per square inch, to fully inflate the parison against the chill walls 41 of the mold. Such inflation of the parison strips the parison lower end from the undersurface of the valve disc 32 and also strips an upper portion of the parison from its surrounding contact with the lower end of the collar 19, while leaving the extreme upper end 36 of the parison confined by the neck mold segments 17.

Finally, the blow mold segments 40 are opened and the final article 45 remains confined by the neck mold segments 17 until these mold segments are opened, by lateral separation, to release the article 45.

Thus, it will be seen that the present invention provides several novel features resulting in an improved method and apparatus.

Probably the most important of these features is the "puffing" or slight expansion of the parison.

Such puffing aids in stripping the parison from the sleeve about which it was originally injection molded, preferably as the sleeve is moved axially from the injection molded parison. By so expanding the parison, any tearing of the parison upon retraction of the sleeve is avoided.

Equally importantly, the "puffing" of the parison eliminates any excess chilling of the tube. By radially spacing the parison from the sleeve, any heat loss to the sleeve is lessened, since there is no directly conductive contact therebetween. Further, both the interior surfaces and the exterior surfaces of the parison are exposed only to a relatively quiescent ambient atmosphere. As a result, the subsequently blown portions of the parison are insulated from any metallic contact and the temperature stabilizes with those somewhat chilled portions of the parison previously in contact with the sleeve being "reheated" by the internal heat of the parison itself. Of course, the parison portions contacting the neck mold are chilled by such contact, but these portions of the parison are not subsequently blown. Similarly, some chilling effect is exerted by the valve disc 32. However, the lower extremity of the parison merely moves a short distance from the valve disc to the bottom of the blow mold, and this relatively small portion of the parison need not expand greatly for such movement. Consequently, the thermal uniformity of the blowable parison is greatly enhanced, the freely blowable character of the parison is retained without undesired chilling and any necessity for reheating is eliminated.

Further, by "puffing" the parison away from the internal sleeve, i.e. radially outwardly, the sleeve need not be retracted in order to thermally isolate the parison and the sleeve.

The utilization of extremely low pressure air over the period of time from the time of exposure of the parison to its enclosure in the blow molds insures the only partial inflation of the parison. Further, the limited volume of air introduced during this period prevents excessive chilling of the parison.

Another feature of substantial importance is the accurate control of the parison and the maintenance of the parison in proper position and condition for blowing from the time of its initial formation by injection molding until it is finally expanded within the blow mold segments 40. This control and positioning of the parison is afforded by the retention of the open upper end of the parison by the neck mold segments 17 and the neck mold collar 19 and the firm support of the closed lower end of the parison by its continued contact with the undersurface of the valve disc 32.

It will be noted also that the initial puffing of the parison can be obtained by either initial retraction of the sleeve in an upward direction or the initial displacement of the valve disc 32 in a downward direction. The results are the same in that low pressure air is then allowed to flow out of the lower open end of the sleeve into the surrounding parison. Since extremely low air pressure is utilized, there is no danger of blowing out or rupturing the parison which is quite fragile at this time, yet the desired initial expansion of the parison is obtained to promote stripping.

Figure 4:
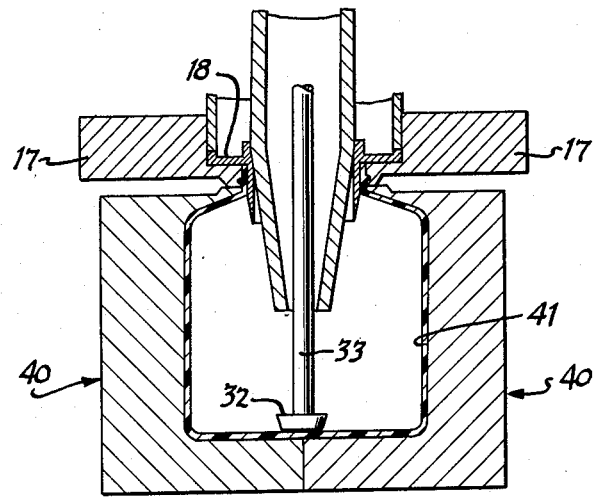
FIGURE 4 is a view illustrating final blowing of the parison internally of a blow mold.
Figure 5:
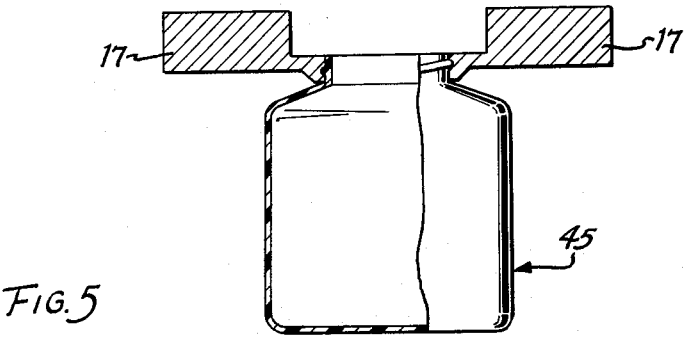
FIGURE 5 is an illustration of the final article still retained in position by the neck mold.

It will be noted in FIGURE 4, particularly, that the lower extremity of the parison is positioned by the valve disc 32 adjacent the bottom of the blow mold cavity 41 prior to blowing. Further, this portion of the parison is the last to be expanded by blowing into contact with the blow mold cavity.

Thus, any tendency of the lower extremity of the parison to "sway" or be displaced sideways from its true centerline position of the final molded article will be prevented.

Further, it will be noted from FIGURE 1 that the mold space defined between the sleeve and the parison mold cavity 12 is of increasing width toward the reduced lower end of the parison. This results in a parison of a wall thickness which is inversely proportional to the cross-sectional area of the parison and the parison can be very easily contoured to insure constant wall thickness in the finally blown article.

I claim:

1. In a method of making a blown plastic article by the injection of air at a blowing pressure into a parison disposed in a blow mold, the steps of initially injection molding the parison about a central core disposed in a surrounding injection mold, stripping the core and the parison thereon from the surrounding injection mold to expose outer peripheral portions of the parison, slightly inflating the parison (1) from contact with the core and (2) to enlarge the exposed outer periphery of the parison by injecting a blowing medium into the parison at a pressure substantially less than a blowing pressure, and positioning the slightly inflated parison in a blow mold prior to the injection of a blowing medium at a blowing pressure.

2. In a method of making a blown plastic container having a neck opening by the injection of plasticized thermoplastic material into an injection mold space circumscribed by an injection mold surrounding a central hollow, air tight core projecting through a neck mold, a movable valve closing the free end of the core and means for supplying air under pressure to the interior of said core, the steps of injecting plasticized material into said mold space in surrounding relation to said core and said valve element, exposing the outer surface of the resulting parison still supported by the core, introducing air under pressure into the interior of said core, relatively moving said valve and said core free end to allow a limited volume of air under pressure to flow into the parison to radially outwardly distend said parison into the open air from contact with said core while retaining the closed end of the parison in position by means of said valve, and transferring the distended parison supported by said neck mold and said valve to a blowing station.

3. The method as defined in claim 2 wherein the step of relatively moving said valve and said core free end is accomplished by moving the core interiorly of the parison while maintaining the valve fixed relative to the parison.

4. The method as defined in claim 2 wherein the step of relatively moving the valve and said core free end is carried out by moving the valve interiorly of the parison while retaining the core in fixed postiion relative to the parison.

5. In a method of making a blown plastic article by the injection of air at a blowing pressure into a parison disposed in a blow mold, the steps of initially injection molding the parison about a hollow central core, jointly displacing said parison and said core to expose the exterior of said parison to the ambient atmosphere, supplying a blowing medium at a pressure substantially less than blowing pressure through the core to the parison to slightly inflate the parison from contact with the core and into the ambient atmosphere, thereby (1) stripping said parison from said core, (2) avoiding chilling of the parison by said core, and (3) allowing said parison to reheat, and subsequently injecting a blowing medium at said blowing pressure into the slightly inflated parison after said parison has been enclosed in a blow mold.

6. In a method of making a blown plastic article by the injection of air at a blowing pressure into a parison disposed in a blow mold, the steps of injection molding the parison interiorly of a parison mold and about a central core assembly having two relatively movable parts, jointly stripping the parison and the core from said parison mold to expose said parison centrally supported by said core assembly, introducing a blowing medium into the core at a pressure substantially less than a pressure required for blowing, relatively moving said core parts to allow the blowing medium to enter the interior of said parison, thereby slightly inflating the parison into the ambient atmosphere, and thereafter enclosing the slightly inflated parison in a blow mold prior to the injection of a blowing medium at said required blowing pressure.

References Cited by the Examiner
UNITED STATES PATENTS

| | | |
|---|---|---|
| 2,667,662 | 2/1954 | Carlton. |
| 2,688,159 | 9/1954 | Swartz et al. |
| 2,715,751 | 8/1955 | Weber _____ 264—97 |
| 2,810,934 | 10/1957 | Bailey. |
| 2,913,762 | 11/1959 | Knowles _____ 18—5 |
| 3,011,216 | 12/1961 | Gussoni. |
| 3,084,382 | 4/1963 | Stuchbery _____ 18—5 |
| 3,091,000 | 5/1963 | Makowski _____ 264—97 |
| 3,137,748 | 6/1964 | Makowski _____ 264—97 |

ROBERT F. WHITE, *Primary Examiner.*

MICHAEL V. BRINDISI, *Examiner.*

L. D. RUTLEDGE, M. H. ROSEN, R. B. MOFFITT,
*Assistant Examiners.*